No. 771,870. PATENTED OCT. 11, 1904.
R. GABRIELSKY.
MACHINE FOR APPLYING TIPS TO CIGARETTES.
APPLICATION FILED MAY 19, 1904.
NO MODEL. 8 SHEETS—SHEET 1.
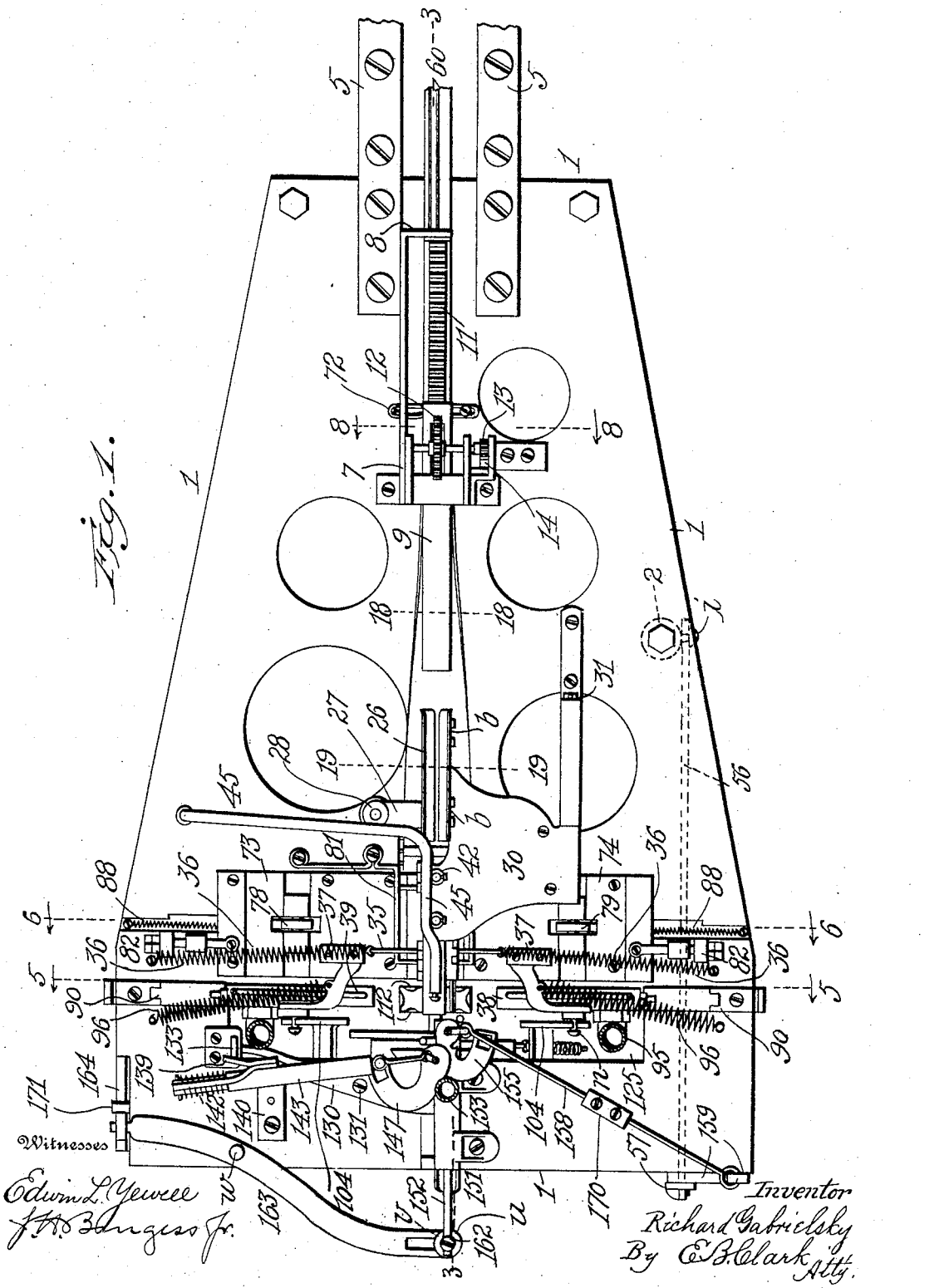
Fig. 1.
Witnesses
Edwin L. Yewell
J. H. Burgess Jr.
Inventor
Richard Gabrielsky
By E. B. Clark Atty.

No. 771,870. PATENTED OCT. 11, 1904.
R. GABRIELSKY.
MACHINE FOR APPLYING TIPS TO CIGARETTES.
APPLICATION FILED MAY 19, 1904.
NO MODEL. 8 SHEETS—SHEET 2.
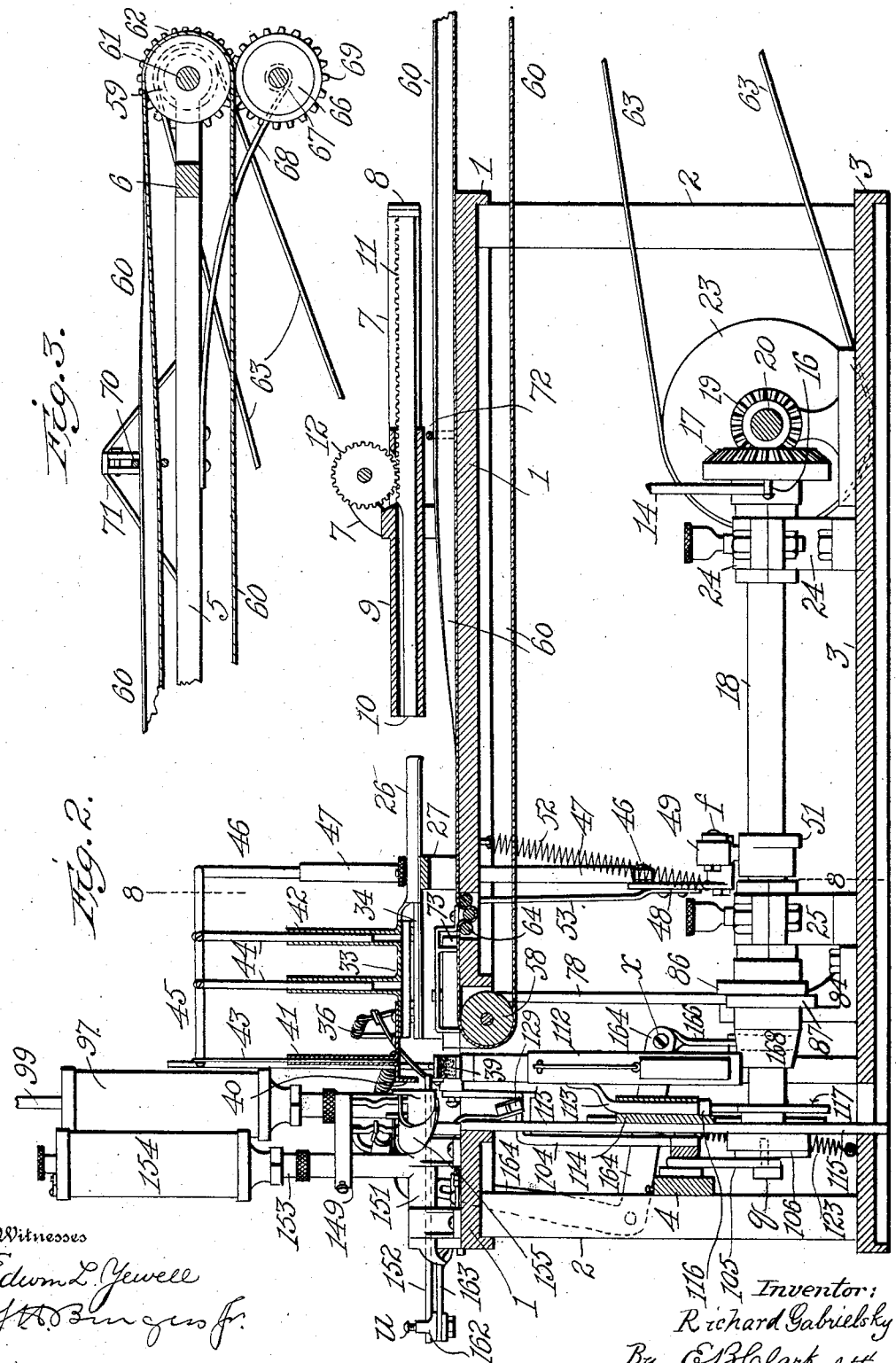
Witnesses
Edwin L. Yewell
J. H. Bingers Jr.
Inventor:
Richard Gabrielsky
By G. B. Clark Atty.

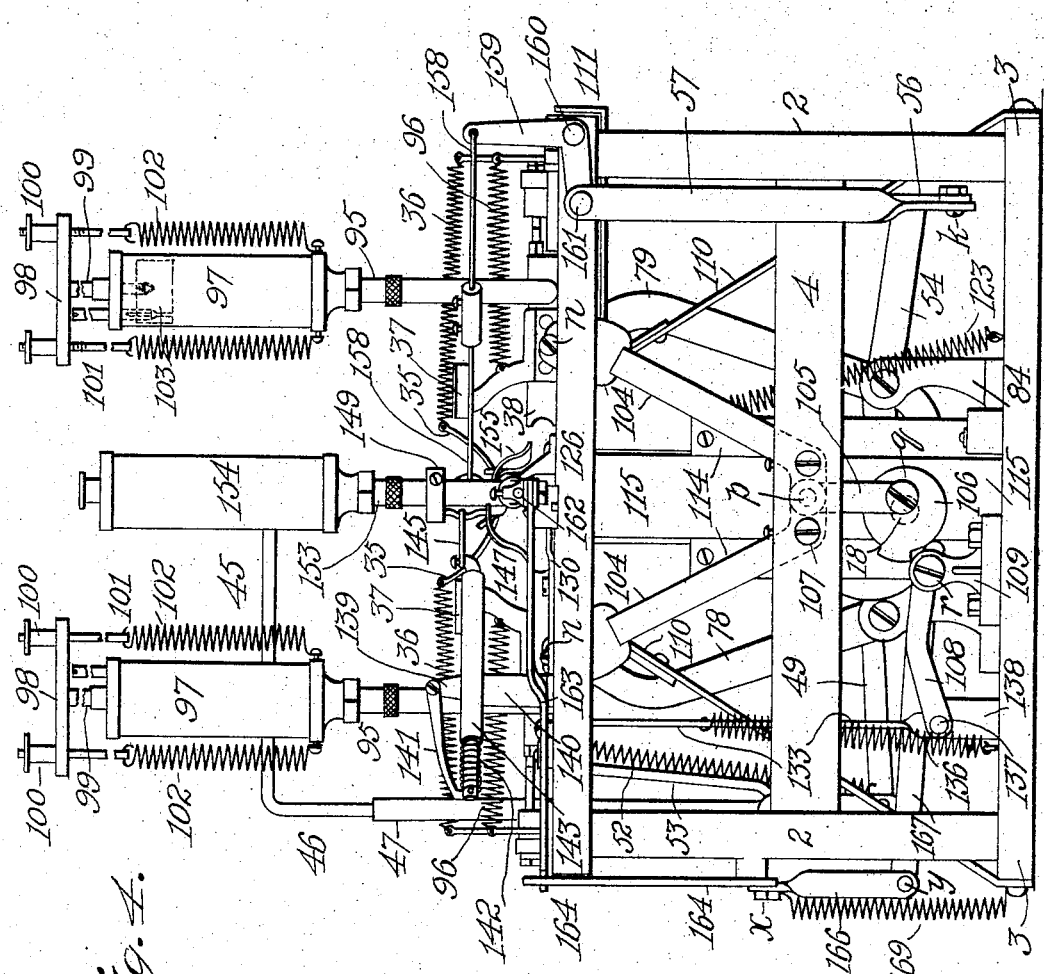

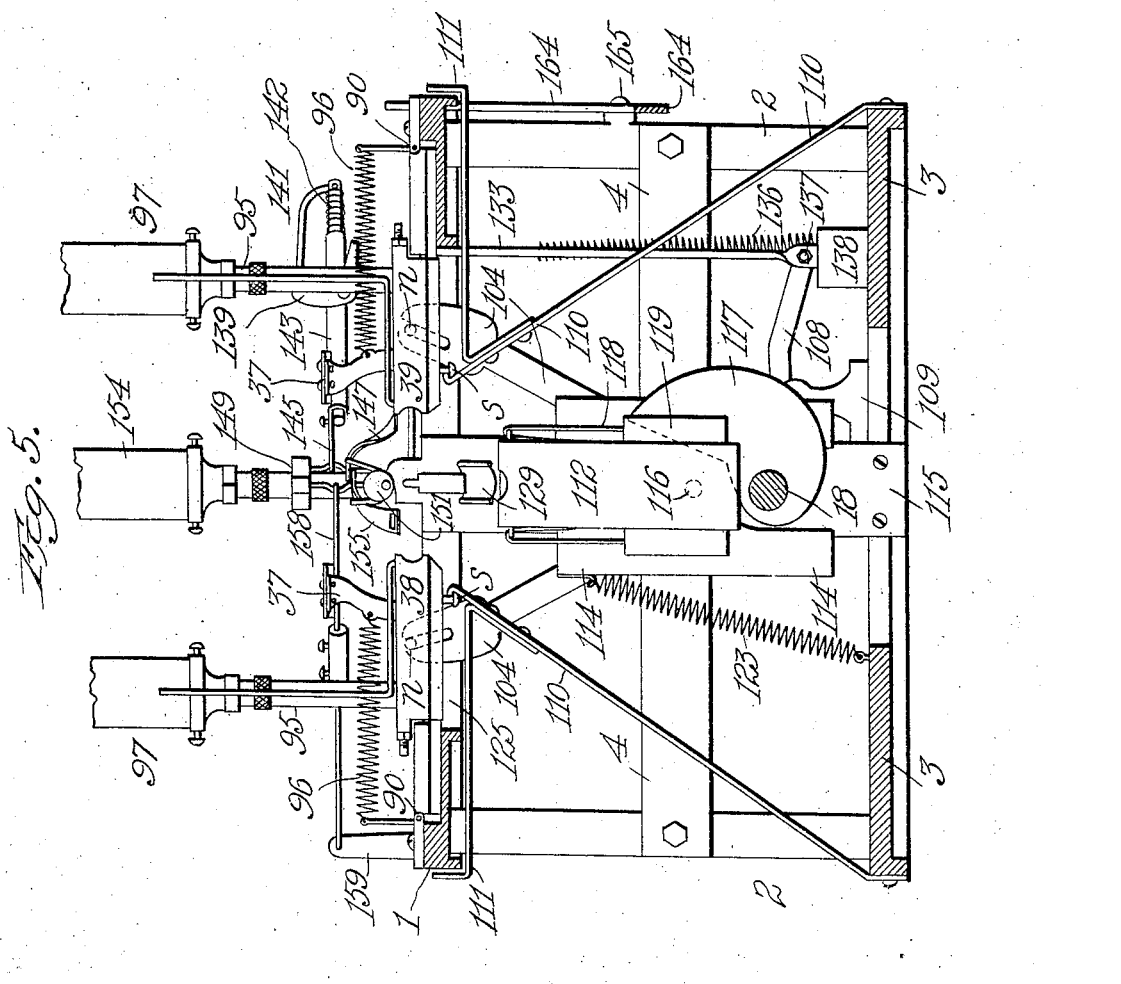

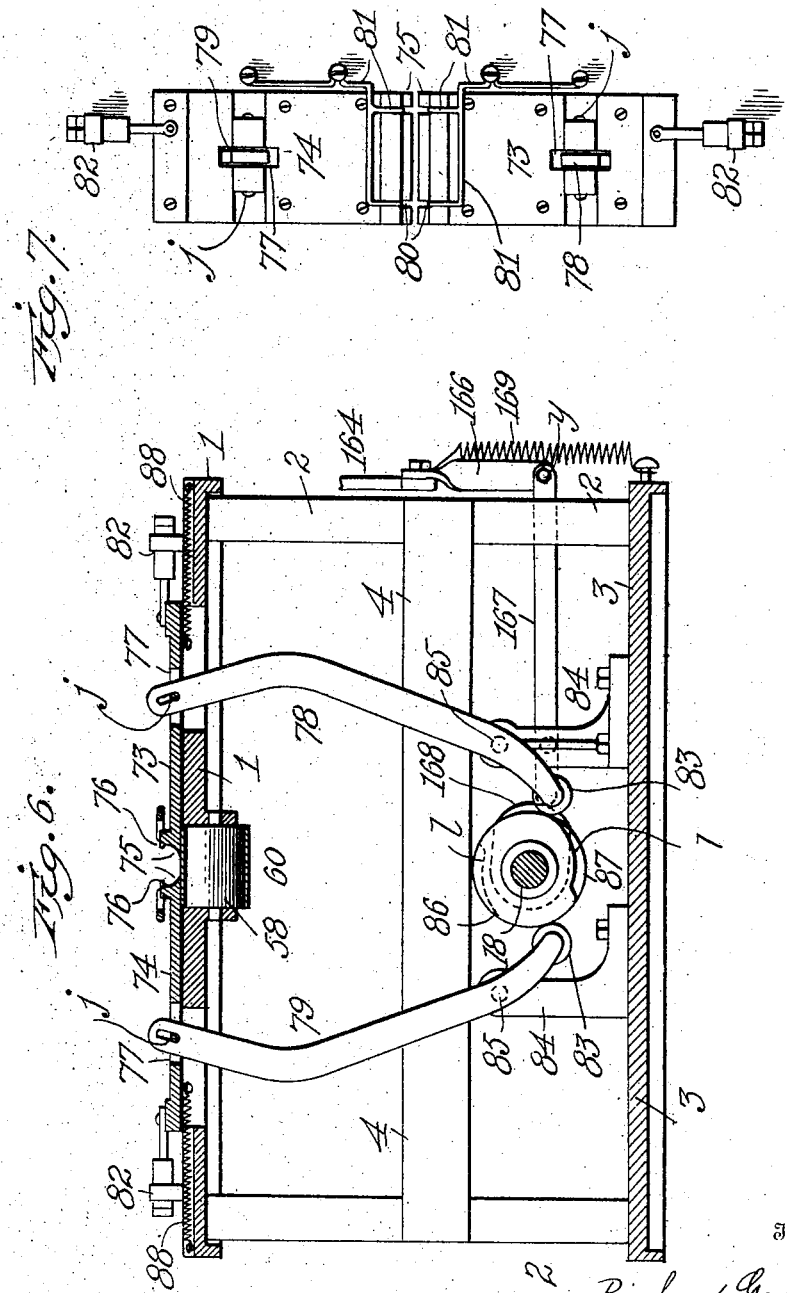

No. 771,870. PATENTED OCT. 11, 1904.
R. GABRIELSKY.
MACHINE FOR APPLYING TIPS TO CIGARETTES.
APPLICATION FILED MAY 19, 1904.
NO MODEL. 8 SHEETS—SHEET 6.
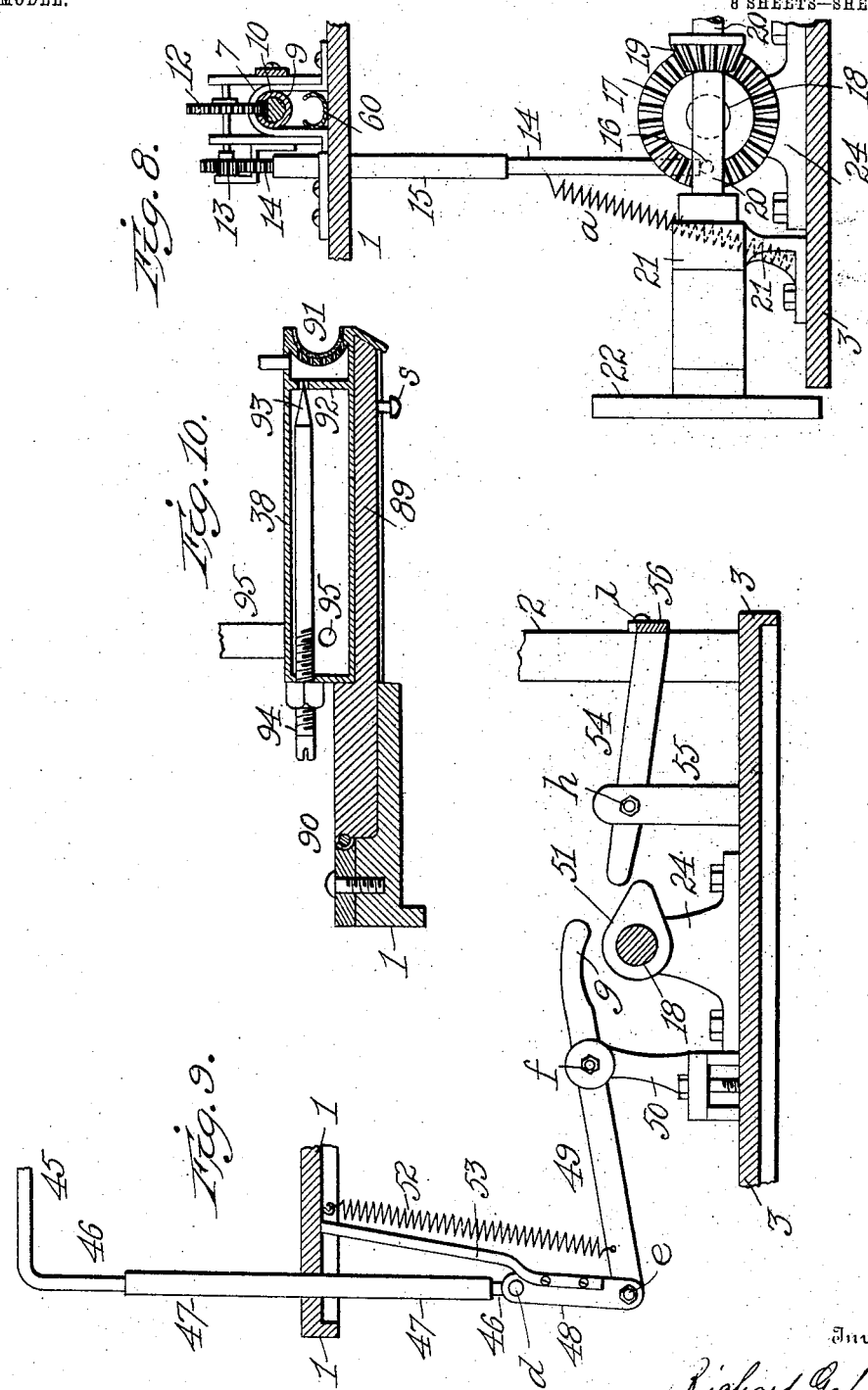
Witnesses
Edwin L. Yewell
Inventor
Richard Gabrielsky
E. B. Clark
Attorney No. 771,870. PATENTED OCT. 11, 1904.
R. GABRIELSKY.
MACHINE FOR APPLYING TIPS TO CIGARETTES.
APPLICATION FILED MAY 19, 1904.
NO MODEL. 8 SHEETS—SHEET 7.
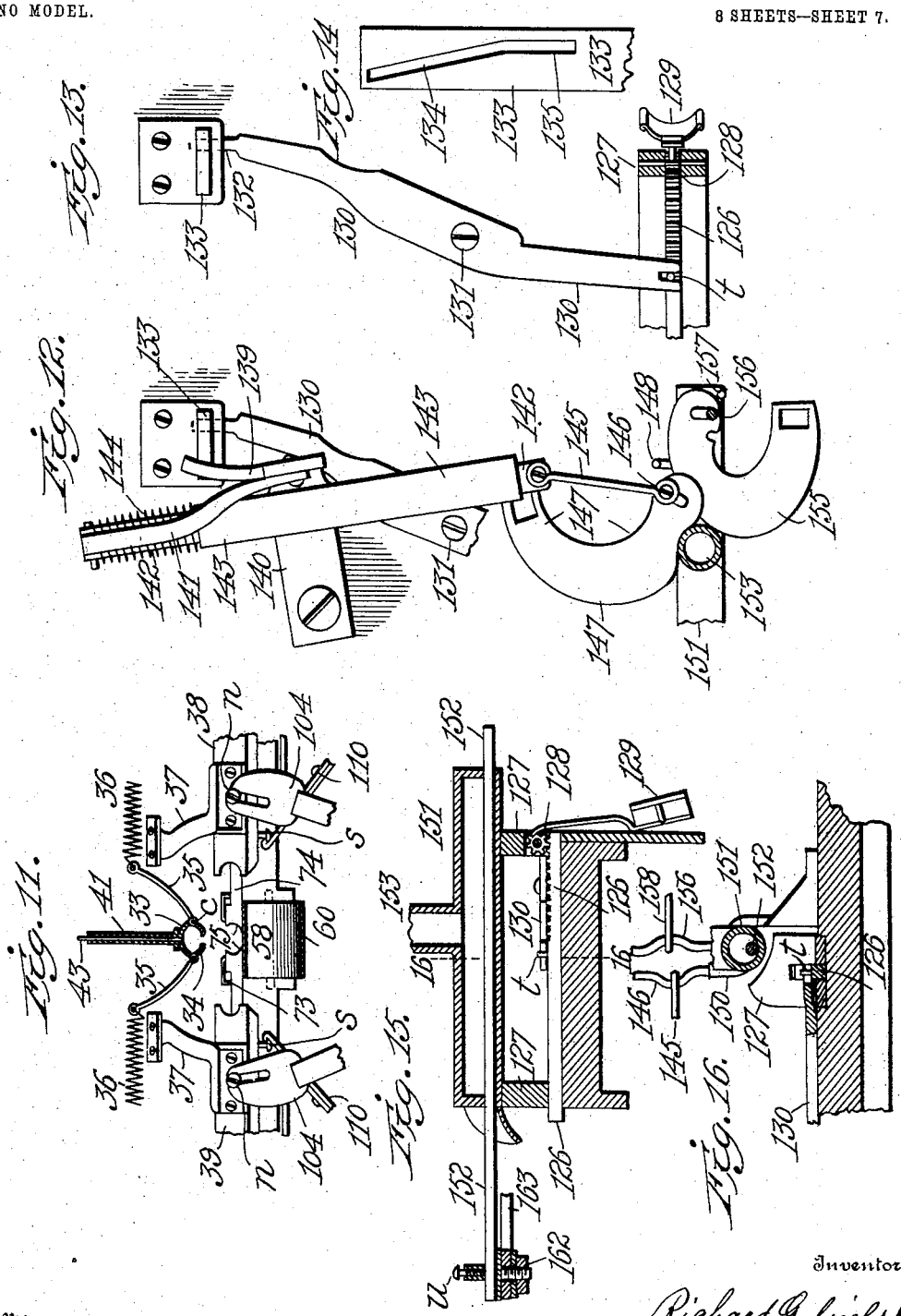
Witnesses
Edward L. Yewell
Inventor
Richard Gabrielsky
E. B. Clark
Attorney

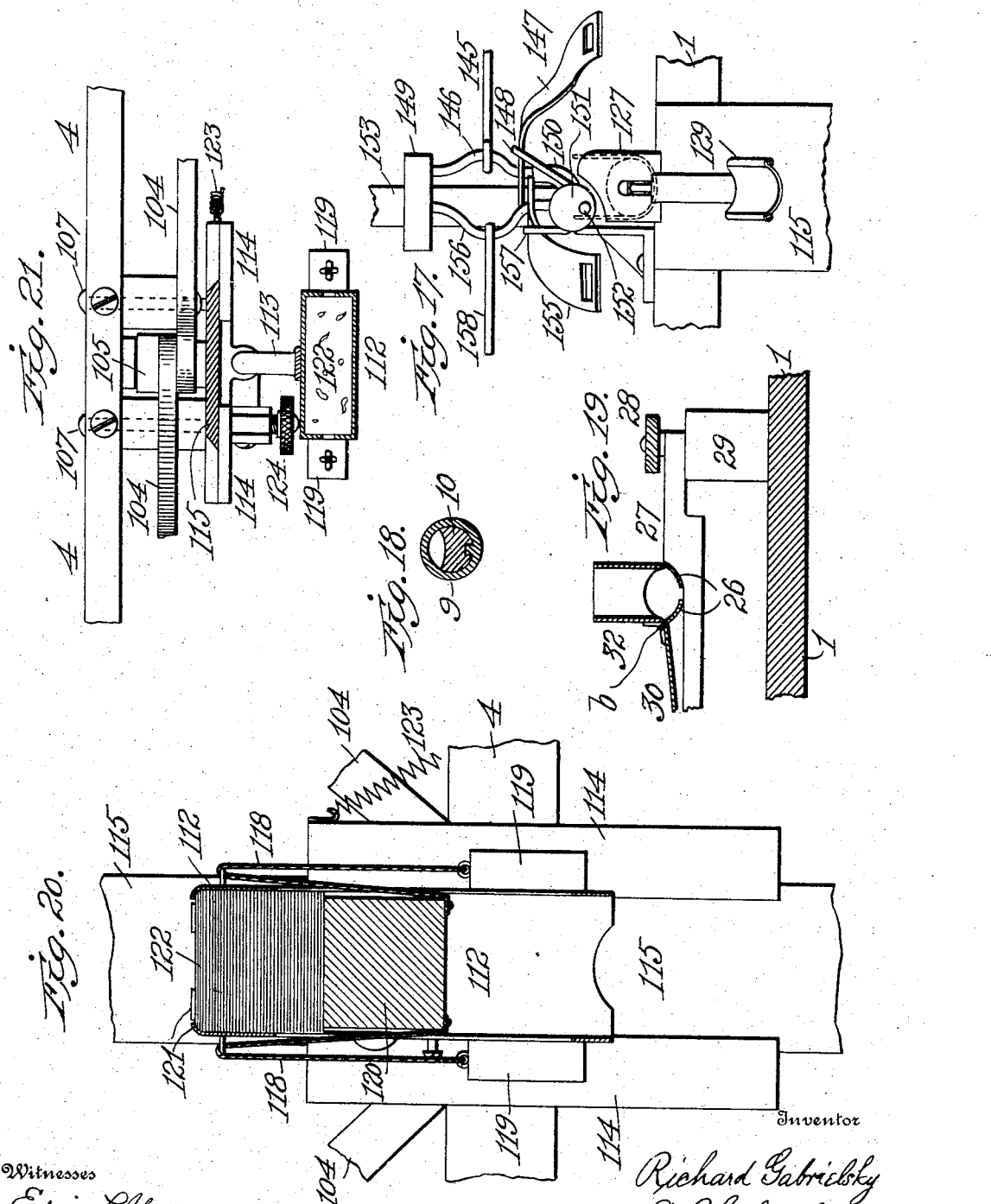

No. 771,870.

Patented October 11, 1904.

UNITED STATES PATENT OFFICE.

RICHARD GABRIELSKY, OF JERSEY CITY, NEW JERSEY.

MACHINE FOR APPLYING TIPS TO CIGARETTES.

SPECIFICATION forming part of Letters Patent No. 771,870, dated October 11, 1904.

Application filed May 19, 1904. Serial No. 208,763. (No model.)

*To all whom it may concern:*

Be it known that I, RICHARD GABRIELSKY, a citizen of the United States, residing at Jersey City, in the county of Hudson and State of New Jersey, have invented certain new and useful Improvements in Machines for Applying Tips to Cigarettes, of which the following is a specification.

This invention relates to machines for applying tips or mouthpieces to cigarettes.

The object of my invention is to provide for rapidly and effectively applying and securing tips or mouthpieces of cork or other suitable material to cigarettes for making them more agreeable and satisfactory to a smoker.

More particularly, the objects of my invention are to provide for uniformly and rapidly feeding cigarettes and holding them in position in the machine while being operated upon, applying an adhesive, as gum, around the circumference of the wrapper at one end of a cigarette, then applying the blank tip of thin sheet-cork or other suitable material to the gummed wrapper, folding up and around the ends of the blank and causing them to adhere to the gummed wrapper, applying gum to an overlapping edge or end of the blank and sealing it by pressure on the wrapper and lower edge of the blank, thus forming a tip or mouthpiece, and then releasing the cigarette and conveying it by a conveyer-belt through pressing devices for completing the sealing operation and discharging the finished cigarette from the machine.

The operations above described are successively performed at a very rapid rate by specially-devised and accurately-operating mechanism in my improved machine.

The devices and combinations of parts constituting my invention herein will be set forth in the claims.

I will now describe the details of construction and operation of my machine by reference to the accompanying drawings, in which—

Figure 1 represents a top plan view of the main part of the machine with the feeding devices, excepting the cigarette hopper or chute, in position. Fig. 2 represents a longitudinal vertical section on line 3 3, Fig. 1, showing parts in elevation. Fig. 3 represents a sectional elevation of the discharge end of the machine, being a continuation of Fig. 2. Fig. 4 represents a front end elevation of the machine. Fig. 5 represents a vertical transverse section on line 5 5, Fig. 1, looking toward the left-hand end of the machine. Fig. 6 represents a vertical transverse section on line 6 6, Fig. 1, looking toward the left-hand or front end of the machine, part of the devices being omitted. Fig. 7 represents a top plan view of the sliding holding jaws or plates for holding a cigarette in position above the conveyer-belt while a tip is being applied. Fig. 8 represents a sectional elevation on line 8, Fig. 1, of gearing and mechanism for operating the reciprocating push-bar in the cigarette-feeding mechanism. Fig. 9 represents an elevation of a cam on the main shaft and certain operating-levers with parts in section. Fig. 10 represents a longitudinal vertical section, on an enlarged scale, of one of the reciprocating gum-boxes. Fig. 11 represents an end elevation, with parts in section, of part of the cigarette feeding, holding, and gumming devices. Fig. 12 represents a detail plan view, on an enlarged scale, of the curved folding-fingers and operating mechanism. Fig. 13 represents a detail plan view of a rack-bar, concave tongue, and operating-lever. Fig. 14 represents a detail view of a slotted link or connecting-bar. Fig. 15 represents a sectional detail view of a gum-receptacle, gumming-rod, and part of the folding devices. Fig. 16 represents a transverse section on line 16 16 in Fig. 15. Fig. 17 represents an elevation, on an enlarged scale, of the blank-tip-folding devices. Figs. 18 and 19 represent sectional detail views, on enlarged scale, on lines 18 and 19, Fig. 1. Fig. 20 represents a vertical transverse section, on an enlarged scale, through the blank-tip magazine, with parts in elevation. Fig. 21 represents a sectional plan view of the same.

The working parts of my machine are mounted in a frame composed of the table 1, posts or legs 2, base 3, and a cross-bar 4, at the front end of the machine, as shown in Figs. 2 and 3. Extension-bars 5 5 are secured to the table 1 and near their outer ends are connected by a cross-bar 6, Figs. 1 and 3, such bars serving to support the conveyer-belt and gearing for the same.

The cigarette-feeding mechanism is constructed and arranged as follows: On the table 1 is secured a frame 7 for supporting a guideway 9, the cigarette push-bar 10, and the operating-gearing. The frame 7 is provided at its rear end with a transverse stop-piece 8 for the push-bar 10. The guideway 9 is preferably made cylindrical, as shown in Fig. 18, and the push-bar 10 is made concave at the top of its front end, while its rear end is provided with teeth 11, forming a rack-bar. The bar 10 is provided at its under side with a groove working on a longitudinal rib or feather to prevent it from turning in the guideway, as shown in Fig. 18. The push-bar 10 is operated by a toothed wheel 12, mounted on a transverse shaft in the frame and engaging with the teeth 11 of the rack-bar, Figs. 1, 2, and 8. To the same shaft carrying wheel 12 is secured a pinion 13, which engages with the vertical rack-bar 14, sliding in the guideway 15, Figs. 1 and 8. The lower end of bar 14 is engaged by the pin 16, secured in the back of the beveled gear 17, Fig. 2, so that the bar will be raised at every revolution of said gear, and thereby operate the wheel 12 and push-bar 10. The rack-bar 14 is connected by a retracting-spring $a$ to the base 3 for drawing down said bar and retracting the push-bar 10. The beveled driving-wheel 17 is secured upon the main shaft 18 and meshes with the beveled pinion or smaller gear 19, secured upon the transverse shaft 20. This shaft 20 is supported in the journal-box on the post 21 and is provided at its outer end with the main driving-gear or belt-wheel 22. The main shaft 18 is supported in journal-boxes on the posts 24 and 25, which are secured to the base 3. To the transverse shaft 20 is also secured a toothed driving-gear or belt-wheel 23. In the drawing Fig. 1 the wheel 23 is shown as carrying a belt for operating the gear-wheels at the outer end of the extension-arms 5, Fig. 3; but in practice the wheel 23 may be toothed and meshed with a series of toothed wheels for operating said gearing at the outer ends of the extension-arms 5. In practice I preferably use a train of toothed wheels for giving more positive motion to said gearing.

The cigarette-guideway 26 and 33 is secured to a transverse bar 27, Figs. 2 and 19, which is supported on the post 29 and secured in place by the thumb-nut 28. The transverse bar 27 forms part of a swinging frame 30, which is provided at one side, Fig. 1, with a long pintle 31 in the keeper, forming a hinged joint. To one side of the guideway 26 is connected by hinges $b$ a cigarette hopper or chute 32, Fig. 19. This hopper or chute may be of any desired height, and the lower edges of the ends are made concave, Fig. 19, for permitting a cigarette and the push-bar to pass below the same when the cigarette is pushed forward in the guideway. The upper guideway 33 forms a continuation of the guideway 26 and is secured to the swinging frame-plate 30. The guideway 33 is completed by the downward and inwardly projecting supporting-jaws 34, Figs. 2 and 11. The jaws 34 are hinged at $c$ to the guideway 33 and are provided with the outwardly-projecting arms 35, to which are connected the retracting-springs 36, which are connected at their rear ends to pins on the table, Figs. 1 and 11. The operating-arms 37 on the gum-boxes 38 and 39 bear upon said arms 35 to open the supporting-jaws 34 when the two gum-boxes are brought together, so as to drop a cigarette into the holding-jaws below. To the front end of the upper guideway 33 is secured a downwardly-turned stop-piece 40, Fig. 2, for arresting a cigarette in the proper position to be dropped into the holding-jaws, so that one end will project beyond the jaws in the path of the two reciprocating gum-boxes.

A cigarette guide-needle and discharge-rods are mounted above the cigarette-guideway and are composed of the vertical guideway 41 and the two vertical guideways 42. These guideways are secured to the upper guideway 33, as shown in Fig. 2. The guide-needle 43 and the two discharging-rods 44 are pivotally connected to the bent supporting-rod 45 46. The guide-needle 43 is longer than the rods 44, as indicated in Fig. 2, so as to pierce a cigarette and guide it down into the holding-jaws below. The vertical portion 46 of the supporting-rod extends down through the guideway 47, secured in the table 1, Fig. 9, and is connected by a link 48, by means of pins $d$ and $e$, to the outer end of the operating-lever 49. This lever is pivotally connected by a pin $f$ to the post 50 and is provided with an inner curved end $g$ for bearing upon the operating-cam 51, which is secured upon the main shaft 18, as shown in Figs. 2 and 9. A retracting-spring 52 connects the outer end of lever 49 with the table, and a stop-rod 53, secured to link 48, bears against the under side of the table for holding the lever, the guide-needle, and the discharging-rods in the proper position. The cam 51 also bears upon the arm 54 of a lever 56. The arm 54 is pivoted by a pin $h$ in the post 55, and the lever 56 is pivoted by a pin $i$ to one of the legs 2 and extends to the front end of the machine, Fig. 4, where it connects by a pin $k$ with the long link 57 for operating one of the folding-fingers, to be hereinafter described.

In an opening 125 near the front end of the table is mounted a pulley or roller 58 for the conveyer-belt 60, and at the outer end of the extension-arms 5, Fig. 3, is mounted another roller or pulley 59 upon the transverse shaft 61. A toothed gear and belt-wheel 62 are secured to said shaft 61. A driving-belt 63 may pass over the wheel 62 when it is made withbut teeth and also over the belt-wheel 23, as shown in Figs. 2 and 3. Three small rollers or rods 64 are secured in an opening near the front end of the table for tightening the conveyer-belt. A friction and pressure roller 66 is secured upon the transverse shaft 67, which is held by a pair of spring-arms 68, which are secured at their inner ends to the arms 5. This roller 66 bears upon the conveyer-belt 60, pressing it against its pulley 59, so that the belt shall be given positive and uniform motion and prevented from slipping on its pulley. A toothed wheel 69 may be applied to the roller 66 and mesh with the toothed wheel 62 for giving positive motion to said roller.

A belt-curving device 70, which may be elliptical, is fixed in the supporting-frame 71 on arms 5, Fig. 3. Another belt-curver, 72, is secured to the table, and others may be used where required to properly curve the belt 60 around the cigarette and press the tip upon the wrapper.

The cigarette-holding jaws 73 and 74, Figs. 6 and 7, are fitted to slide in guideways on the table and at the inner meeting faces are beveled or concaved to form quarter-grooves 75, which when the jaws are closed or juxtaposed form a semicircular groove open at the top. At the upper edges of these inner faces are provided narrow inwardly-projecting flanges 76 slightly above the transverse axis of the groove for partly overlapping a cigarette and securely holding the same in place when the jaws are juxtaposed. In the operation of the machine a cigarette is dropped or discharged into the groove just before the jaws are closed, and then as closure is completed the flanges 76 partly overlap the cigarette on opposite sides and hold it in place while one end of the wrapper is being gummed and a cork tip applied. The jaws are provided with slots 77, into which project the upper ends of the operating-levers 78 and 79, and are connected by pins $j$ to the jaws, as shown in Figs. 6 and 7. The inner edges of the jaws are provided with slots 80, into which project the bent guide-wires 81, which are secured at their outer ends by screws to the table, as shown in Fig. 7. These guide-wires serve to retain the cigarette centrally on the conveyer-belt when it is dropped by the holding-jaws. To the rear ends of the jaws are secured rods which work through stop-posts 82 in the table, and the rods are provided with sleeves or cushions which bear against the posts when the jaws are thrown open. The bent operating-levers 78 and 79 are pivotally connected by pins 85 to the posts 84 and are preferably provided at their lower ends with bearing-rollers 83. The cams 86 and 87 are secured on shaft 18 and are circular except at the short flat faces 1, so that they serve to hold the jaws 73 and 74 together during the greater portion of their revolution and while the cigarette is being tipped. Coiled retracting-springs 88 are connected to the jaws and to opposite sides of the table and serve to open the jaws at the instant that the flat cam-faces 1 bear upon the operating-levers 78 and 79. A cam 168 is secured to shaft 18, Figs. 2 and 6, adjacent to cams 86 and 87, for operating lever 167, its connections, and a gumming-rod, to be hereinafter described.

A pair of reciprocating gum-boxes 38 and 39 are arranged parallel with and adjacent to the holding-jaws in an opening 125 in the table, as shown in Figs. 1 and 11. The boxes are provided with guideways which slide on guide-bars 89, Fig. 10, which are connected by hinges 90 to the table. The boxes 38 and 39 are made with inner concave ends 91, which are perforated and may be covered with felt or other porous fabric for permitting the flow of gum or other adhesive material. A transverse partition-plate 92 is fixed near the front end of each box and has a valve-opening in which is seated a conical valve 93, having a screw-threaded stem 94 passing through an opening in the rear end of the box, Fig. 10, for regulating the flow of gum. A gum-inlet opening and pipe 95 connects with each box and with an elevated cylindrical reservoir 97, Figs. 2, 4, and 5. Coiled retracting-springs 96 connect with the arms 37 on the boxes and with pins in the opposite sides of the table, as shown in Figs. 4 and 5.

To a cross-bar 98, at the top of each reservoir 97, is secured a piston-rod which connects with a piston or follower 103 in the reservoir. The piston is provided with an air-vent opening, valve, and rod, as indicated by dotted lines in Fig. 4. Thumb-nuts 100 are applied to the screw-threaded rods 101 above the bar 98, and springs 102 connect the rods to pins or a cross-bar at the lower end of the reservoir. By means of these nuts 100 and rods 101 the pressure of the follower on the gum may be regulated.

The gum-boxes 38 and 39 are reciprocated by the crank-levers 104, having forked or slotted upper ends which engage with side pins $n$ on the boxes. The levers 104 have short inwardly-turned lower ends and are pivotally connected by pins 107 to the cross-bar 4 and end guide-bar 115. The inner lower ends of levers 104 are also connected by a pin $p$ to the link 105, which connects by the eccentric pin $q$ with cam 106, Fig. 4, on the end of main shaft 18. The cam 106 bears upon the operating-lever 108, connected by pin $r$ to a post 109. The lever 108 operates part of the blank-folding devices, as will be hereinafter described.

The long spring catch-bars 110, Fig. 5, are secured at their lower ends to the base 3 and at their upper ends engage with headed pins $s$ on the guide-bars 89 of the gum-boxes for holding them in a horizontal position. Push-bars 111 connect with the bars 110 for disengaging them from the pins *s* when the boxes are to be raised on their hinges 90.

The reciprocating magazine 112, Figs. 2, 5, 20, and 21, is connected by a downwardly-projecting arm 113, Fig. 21, with the guideway 114, sliding on the vertical guide-bar 115. To the lower end of the guideway 114, Fig. 2, is secured a roller 116, on which bears the long cam 117, Fig. 5, for raising the magazine 112. The cam 117 is secured to the main shaft 18. The magazine is provided with a movable bottom 120, to which are attached the cords and weights 118 and 119, Figs. 5 and 20, for feeding upward the blank tip 122. The upper edges 121 of the magazine are turned inward for lightly holding the edges of the blanks, but permitting a blank to be removed when it is raised and pressed against the gummed cigarette-wrapper. A retracting-spring 123, Fig. 5, connects with the guideway 114 of the magazine and with the base 3 for quickly drawing down the magazine after it has been raised and released by cam 117. An adjusting-screw 124, Fig. 21, and connections are provided for fixing the magazine in the correct position.

A transverse opening 125, Figs. 1 and 5, is provided in the front end of the table for the magazine, gum-boxes, their operating-levers, and other parts to work in.

The folding and sealing devices for applying blank tips to cigarettes are constructed as follows: A sliding rack-bar 126, Figs. 13, 15, 16, and 17, is arranged in a guideway centrally at the front end of the table and in the posts 127 and engages the toothed pinion 128, journaled in the inner post. To the pinion is secured a concave tongue 129, adapted for curving up a blank after it has been stuck to the gummed wrapper and supporting the end of the cigarette while the blank is being folded around and sealed upon the wrapper. It is therefore called a "curving" and "supporting" tongue. An operating-lever 130, having a forked end, engages a pin *t* on the rack-bar and is pivoted by pin 131, Figs. 1 and 13, to the table and has an outer cylindrical end 132 inserted in the slot 134 135 in the upper end of the vertical reciprocating bar 133, Figs. 4, 5, and 14. The upper portion 134 of the slot is diagonal or slanting for oscillating the lever 130, and the lower portion 135 of the slot is made vertical for permitting bar 133 to move up higher to operate other mechanism without giving further motion to said lever. The bar 133 is pivotally connected at its lower end by pin 137 to the operating-lever 180, Fig. 4, which is pivoted by pin *r* to post 109 and bears at its inner end upon the operating-cam 106, as above described. A retracting-spring 136 connects with bar 133 and with the base 3. A block of rubber or other suitable material 138, Fig. 5, serves as a rest or support for bar 133 and the outer end of lever 108.

One of the curved folding-fingers, 147, is operated by the following mechanism: A crank-lever 139, Figs. 1, 4, 5, and 12, is pivoted to a post 140, secured to the table, and has a horizontal arm extending over the upper end of the vertical bar 133, so as to be raised thereby, and an upright arm, Fig. 5, connecting by a link 141 with the rear end of a reciprocating rod 142 in the sleeve or guideway 143, secured to post 140. A retracting-spring 144 is coiled on rod 142 between the end of the sleeve and an end pin, as shown in Fig. 12. To the inner end of rod 142 is pivotally connected the link 145, which connects at its inner end with the crank 146, supported in bearings in the bracket 149 and post 150, Fig. 17. The bracket 149 is secured to pipe 153, and the post 150 is secured to the gum-box 151. To the straight portion or shaft of crank 146 is rigidly secured the curved folding-finger 147. This finger is turned by its crank a quarter-revolution, so that its outer free end is moved into a longitudinal central line, Fig. 1, just above the end of a cigarette which may be in the holding-jaws and serves to turn or bend over one end of a blank upon the gummed wrapper. A stop-pin 148 on box 151 arrests the finger 147 in the right position.

The longitudinal gum-box 151, Figs. 1, 2, and 15, is supported on posts on the table and is provided with a reciprocating gumming-rod 152, working through end openings in the box. A gum-inlet pipe 153 connects with the box and with the supply-reservoir 154, Figs. 2 and 4.

The second curved folding-finger, 155, Figs. 12 and 17, is rigidly secured to the straight shaft of the crank 156, which is supported in bearings in bracket 149 and gum-box 151. A connecting-rod 158, having an adjustable joint 170, Fig. 1, connects with crank 156 and with a crank-lever 159, Fig. 4, which is pivoted by a pin 160 to the front edge of the table and is connected by pin 161 to the vertical link 57, which latter connects by pin *k* to the long lever 56, having an arm 54 bearing upon the operating-cam 51, Figs. 1, 4, and 9, as above described. These operating parts give the finger 155 a quarter-turn, so as to move its free end into line with a cigarette and serves to bend and turn over the second end of a blank tip and press it upon the gummed wrapper. A stop-pin 157 on the gum-box, Fig. 12, arrests the finger 155 with its inner end directly above the cigarette and in contact with the folded tip.

The mechanism for operating the reciprocating gumming-rod 152 is constructed as follows: A post 162, Figs. 1 and 15, is loosely held in the slot *v* at the inner end of the curved operating-lever 163 and is secured by screw *u* to the rod 152. The lever 163 is pivoted by pin $w$ to the top of the table and has an outer cylindrical end which is engaged in a slot in the upper end of a crank-lever 164, Figs. 2 and 4, at the rear side of the frame. The lever 164 is pivoted at its angle to post 2, and its horizontal arm, Fig. 2, is connected by pin $x$ to the link 166, which is connected by pin $y$, Fig. 4, to the inwardly-projecting cam-lever 167, pivoted to one of the posts 84, Fig. 6, and bearing at its inner end on the operating-cam 168, secured to shaft 18, as shown in Figs. 2 and 6. A retracting-spring 169, Figs. 4 and 6, connects with the horizontal arm of lever 164 and to the base 3. A stop-pin 171 in the edge of the table, Fig. 1, arrests the movement of lever 164. By means of the above-described mechanism the rod 152 is reciprocated in the gum-box 151 and caused to project at the forward end thereof, as indicated in Fig. 15, into the path of the overlapping end of a blank tip as such end is being bent and turned over by the finger 155 onto the wrapper and upon that end of the blank which has previously been pressed upon the gummed wrapper. As the finger 155 turns over the end of the blank such end bears against the gum-rod 152, receiving gum therefrom, so that it may be sealed on the other end of the blank when overlapped and pressed thereon by the finger 155.

Power being applied and the machine put in motion, the operation of applying tips or mouthpieces to cigarettes may be conducted as follows: Cigarettes are placed by hand on the guideway 26 or preferably in the hopper or chute 32, Fig. 19, and are pushed forward one at a time by the reciprocating push-bar 10 into the guideway 33, where as a cigarette enters it is grasped by the closing supporting-jaws 34, the forward end of the cigarette being against the stop-piece 40, Fig. 2. The guide-needle 43 now descends, piercing the end of the cigarette. The jaws 34 open, and the rods 44 push or discharge the cigarette down into the groove 75 of the holding-jaws, where it is held while gum is being applied to the wrapper and a blank applied to, folded, and sealed upon the gummed wrapper. The cigarette being held in the jaws with its end projecting beyond the same, the gum-boxes 38 and 39 immediately slide together and apply gum by their concave ends around the circumference of the wrapper and at the same time support the end of the cigarette, so that the wrapper will not be bent or broken. The gum-boxes are immediately slid apart by their levers 104, and at the same time the magazine 112 is raised by the long cam 117, thereby pressing one of the blanks 122, Fig. 20, against the gummed wrapper, to which it adheres. As the magazine is retracted the concave tongue 129 is raised into a horizontal position, thereby curving up the blank at opposite sides of the middle portion, which is stuck to the wrapper, and supporting the end of the cigarette while the ends of the blank are being folded over and sealed on the wrapper. While the tongue 129 is being raised and during the latter part of its movement the curved finger 147, Figs. 12 and 17, is turned inward and folds over the left-hand end of the blank and presses it upon the gummed wrapper. The gumming-rod 152 is now pushed out above the cigarette, and the curved finger 155 is turned inward, bending up the right-hand end of the blank and causing its overlapping edge to wipe gum off from the rod, and then folds over and presses such end on the wrapper and on the sealed left-hand edge of the blank, making a neat narrow seam or joint. The holding-jaws 73 and 74 are now opened, dropping the cigarette upon the conveyer-belt 60, by which it is conveyed through the oval guides and pressing devices 70 and 72 and then discharged at the rear end of the machine into a receptacle. Immediately following the discharge of a cigarette from the supporting-jaws 34 into the holding-jaws 73 and 74 another cigarette is pushed by bar 10 into the guideway 33 and embraced by the jaws 34, and the operations of applying tips are rapidly repeated.

The machine, as shown in the drawings, is designed and adapted more particularly for applying tips to oval cigarettes; but my invention is not confined to such particular application and use. By slight modifications in the shapes of some of the parts the machine will be equally well adapted for effectively applying tips to cylindrical cigarettes.

The details of construction of many of the parts may be modified and changed without departing from the spirit and scope of my invention, and I wish it understood that my invention is not confined to the construction and arrangement shown in the drawings.

Having described my invention, what I claim, and desire to secure by Letters Patent, is—

1. The combination with cigarette-holding jaws, of means for feeding cigarettes thereto, including a guideway and a movable supporting and discharging device above said jaws, substantially as described.

2. The combination with cigarette-holding jaws, of feeding devices above the same, including means for supporting a cigarette, preventing it from turning, and for discharging it into said jaws, substantially as described.

3. The combination with cigarette-holding jaws, of a guideway above the same, a pair of supporting-jaws and means for operating the same to drop a cigarette into said holding-jaws, substantially as described.

4. The combination with cigarette-holding jaws, of a pair of supporting-jaws and a stop device adapted to support a cigarette above and discharge it into the holding-jaws with its end projecting beyond the same in the path of gum-applying devices, substantially as described.

5. The combination with cigarette-holding jaws, of a pair of supporting-jaws above, and means for operating them to drop a cigarette into said holding-jaws, substantially as described.

6. The combination with a cigarette-holding device and a pair of reciprocating gum-boxes for applying gum, at one end, around a cigarette-wrapper, of feeding devices, including a cigarette-guideway, and a reciprocating push-bar therefor, substantially as described.

7. The combination with cigarette holding and gumming devices, of feeding devices above the same, including a reciprocating push-bar, a cigarette-guide and supporting-jaws and operating mechanism therefor, substantially as described.

8. A cigarette-feeding device, comprising a cigarette-guideway, opening and closing supporting-jaws, a reciprocating needle for preventing a cigarette from turning and a discharging device, substantially as described.

9. Cigarette-feeding mechanism, comprising a cigarette-guideway, a reciprocating push-bar therefor, cigarette-supporting jaws opening downward in the guideway and a vertically-reciprocating discharging device, substantially as described.

10. Cigarette-feeding devices, comprising a cigarette-guideway, laterally-movable supports, a guide-needle adapted to pierce a cigarette and a discharging device, substantially as described.

11. In cigarette-feeding mechanism, the combination with a cigarette-guideway and a movable support thereon, of a vertically-reciprocating guide-needle and discharge pin or rod, substantially as described.

12. The combination with a cigarette-guideway and laterally-movable supporting-jaws thereon, of a feed box or chute and a reciprocating push-bar working in line with said guideway, substantially as described.

13. The combination with a cigarette-guideway and movable support, of a cigarette feed or supply receptacle above the guideway, a reciprocating toothed push-bar, a transverse shaft above the same carrying a toothed wheel engaging said bar, and a pinion, a vertical rack-bar engaging said pinion and a gear-wheel carrying a pin engaging with the lower end of said bar, substantially as described.

14. The combination with a cigarette-guideway, laterally-movable jaws thereon and a stop-piece beyond the jaws, of a cigarette-receptacle above the guideway and a push-bar working below the receptacle to push cigarettes lengthwise on the guideway, substantially as described.

15. The combination with a cigarette-guideway having a movable cigarette-support and vertical guideways at the top, of a vertically-movable frame having a guide-needle and a discharge pin or rod working in the vertical guideways, substantially as described.

16. In a machine for applying tips to cigarettes, the combination with a table, of a pair of sliding reciprocating holding-jaws having downwardly-beveled or concaved lower edges forming a groove, when juxtaposed, and narrow inwardly-projecting flanges at their upper edges adapted to hold a cigarette in the groove when the jaws are closed, substantially as described.

17. In a machine for applying tips to cigarettes, the combination with downwardly-opening supporting-jaws above, of a pair of reciprocating holding-jaws below and having, at their inner faces, inwardly-projecting, meeting, lower edges and narrow flanges above for engaging a cigarette, substantially as described.

18. The combination with a pair of cigarette-holding jaws and a movable cigarette-supporting device above, of a pair of oppositely-reciprocating gum-boxes having means for operating said supporting device, substantially as described.

19. The combination with a pair of cigarette-holding jaws and movable supporting-jaws above, of a pair of reciprocating gum-boxes having means for opening said supporting-jaws, substantially as described.

20. The combination with cigarette-holding jaws, a pair of reciprocating gum-boxes for gumming the end of a cigarette-wrapper and means for applying a blank tip to the gummed wrapper, of adjacent devices for curving the blank around, and pressing it upon, the gummed wrapper, substantially as described.

21. The combination with cigarette-holding jaws, means for gumming the end of a cigarette-wrapper and a movable magazine for applying a blank tip to the gummed wrapper, of means for curving up the blank and two movable fingers serving to bend and press the ends of the blank around and upon the gummed wrapper, substantially as described.

22. The combination with cigarette-holding jaws, means for gumming the end of a cigarette-wrapper and applying a blank tip thereto, of a device for curving up the blank from below, and two oppositely-moving fingers for bending and pressing the blank around and upon the gummed wrapper, substantially as described.

23. The combination with devices for holding a cigarette, gumming the wrapper and applying a blank tip thereto, of a lower blank-curving device and two curved oppositely-movable fingers for sealing the blank tip around the gummed wrapper, substantially as described.

24. The combination with devices for holding a cigarette, gumming the wrapper and applying a blank tip thereto, of a lower blank-curving device and two curved fingers secured to turning shafts and means for operating the same to seal a blank around the gummed wrapper, substantially as described.

25. The combination with a cigarette-holder, means for gumming one end of a cigarette-wrapper and applying a blank tip thereto, of means for bending or curving the blank, and a movable gumming-rod adapted to apply gum to the overlapping edge of the blank, substantially as described.

26. The combination with a cigarette-holder, means for gumming one end of a cigarette-wrapper and applying a blank tip thereto, of a reciprocating gumming-rod adapted to apply gum to the overlapping edge of the blank, substantially as described.

27. The combination with a cigarette-holder, means for gumming one end of a cigarette-wrapper and applying a blank tip thereto, of a reciprocating gumming-rod, means for supplying gum thereto and means for passing the overlapping edge or end of the tip in contact with said rod, substantially as described.

28. In a machine for applying tips to cigarettes, a gum box or receptacle having opposite end openings and a reciprocating gumming-rod working through said receptacle and openings, substantially as described.

29. The combination with a gum-supplying box or receptacle and a reciprocating gumming-rod receiving gum therefrom, of means for applying the end or edge of a blank tip in contact with said rod for being gummed, substantially as described.

30. In a machine for applying tips to cigarettes, folding and sealing devices, comprising a curving and supporting device, a movable rod for applying gum to the overlapping edge of a blank, and two oppositely-moving fingers for bending and sealing the blank on the wrapper, substantially as described.

31. In a machine for applying tips to cigarettes, folding and sealing devices, comprising a lower curving and supporting tongue and two curved oppositely-moving fingers operating above said tongue, substantially as described.

32. In a machine for applying tips to cigarettes, folding and sealing devices comprising a curving and supporting tongue, a reciprocating gumming-rod and two oppositely-moving fingers, substantially as described.

In testimony whereof I have signed my name to this specification in presence of two witnesses.

RICHARD GABRIELSKY.

Witnesses:
CARL RAISCH,
GEORGE E. BLUM.